(12) United States Patent
Prather, Jr.

(10) Patent No.: US 10,774,865 B2
(45) Date of Patent: Sep. 15, 2020

(54) QUICK-RELEASE ADAPTER

(71) Applicant: STRKN LLC, Scottsdale, AZ (US)

(72) Inventor: Gregory Neal Prather, Jr., Mesa, AZ (US)

(73) Assignee: STRKN LLC, Scottsdale, AZ (US)

( * ) Notice: Subject to any disclaimer, the term of this patent is extended or adjusted under 35 U.S.C. 154(b) by 414 days.

(21) Appl. No.: 15/833,302

(22) Filed: Dec. 6, 2017

(65) Prior Publication Data

US 2018/0163765 A1    Jun. 14, 2018

Related U.S. Application Data

(60) Provisional application No. 62/431,668, filed on Dec. 8, 2016.

(51) Int. Cl.

| *F16B 21/16* | (2006.01) |
|---|---|
| *F16B 21/12* | (2006.01) |
| *F16B 21/02* | (2006.01) |
| *B60R 11/00* | (2006.01) |

(Continued)

(52) U.S. Cl.
CPC .............. *F16B 21/16* (2013.01); *F16B 2/065* (2013.01); *F16B 21/02* (2013.01); *F16B 21/12* (2013.01); *B60R 7/14* (2013.01); *B60R 11/00* (2013.01); *B60R 2011/0059* (2013.01); *Y10T 403/585* (2015.01); *Y10T 403/7005* (2015.01); *Y10T 403/7041* (2015.01); *Y10T 403/7067* (2015.01)

(58) Field of Classification Search
CPC ... B60R 7/14; B60R 11/00; B60R 2011/0059; B60R 2011/0071; B60R 2011/0078; F16B 2/065; F16B 21/02; F16B 21/12; F16B 21/16; Y10T 403/581; Y10T 403/583; Y10T 403/585; Y10T 403/589; Y10T 403/591; Y10T 403/602; Y10T 403/648; Y10T 403/7005; Y10T 403/7015; Y10T 403/7041; Y10T 403/7067; Y10T 403/7071
USPC .... 403/316, 317, 318, 320, 322.1, 327, 338, 403/348, 353, 362, 374.3, 374.5
See application file for complete search history.

(56) References Cited

U.S. PATENT DOCUMENTS

| 5,255,993 A | * | 10/1993 | Kovacs | ................... F16B 7/042 |
|---|---|---|---|---|
| | | | | 403/316 |
| 5,626,435 A | * | 5/1997 | Wohlhuter | .............. F16B 21/02 |
| | | | | 403/348 |

(Continued)

*Primary Examiner* — Josh Skroupa
(74) *Attorney, Agent, or Firm* — Hartman Titus PLC; John D. Titus

(57) ABSTRACT

A quick-release adapter consists of a top unit and a base unit. The top unit has a cylindrical hub with multiple lobes extending radially outward from the hub. The lobes each have an inclined upper surface and a flat, horizontal lower surface. The base unit has a cavity that is sized and shaped to match the lower portion of the top unit, with multiple lobe-shaped openings and side walls with inclined upper surfaces that match the incline of the upper surfaces of the lobes. A detent plunger protrudes through the lower surface of the cavity at a location that is 45° offset from the center of one of the lobe-shaped openings. In operation, the top unit is inserted into the base unit and rotated until the detent plunger engages the recess in the lower surface of one of the lobes. This locks the top unit from further rotation.

6 Claims, 4 Drawing Sheets

(51) Int. Cl.
*B60R 7/14* (2006.01)
*F16B 2/06* (2006.01)

(56) References Cited

U.S. PATENT DOCUMENTS 6,108,944 A * 8/2000 Savoie ................. A43C 15/161
403/348
6,444,941 B1 * 9/2002 Russo ..................... B23H 7/26
403/362

* cited by examiner

US 10,774,865 B2

QUICK-RELEASE ADAPTER

BACKGROUND OF THE INVENTION

This invention relates generally to hunting equipment and, in particular, to a mounting arm for spotting scopes and/or firearms.

In hunting, shooting or other outdoor activities it is often advantageous to be able to mount binoculars, spotting scopes, firearms or other equipment to a solid structure, such as the roll bar of an off-road vehicle. Often the equipment is carried inside the vehicle for protection, however, when it is needed, the equipment must be quickly mounted to the vehicle hard mount. In some cases multiple pieces of equipment, for example a rifle and a spotting scope need to be exchanged on the mount. Accordingly, what is needed and what the prior art does not offer is a mounting arm that can be rigidly attached to a vehicle or other solid structure that includes a feature for quickly changing the mounted equipment.

SUMMARY OF THE INVENTION

The present invention comprises a quick-release adapter. In an illustrative embodiment, the adapter is attached to a mounting arm, suitable for mounting a spotting scope, rifle or other equipment to a solid structure, for example, to the roll bar of an off-road vehicle. In an illustrative embodiment, the fixed end of the mounting arm includes a bracket for attaching the mounting arm to the solid structure. The arm is attached to the bracket by means of a swivel joint that can be tightened to fix the arm in a particular orientation, or loosened to allow the arm to be repositioned. The quick release adapter is attached to the free end of the mounting arm and consists of a top unit, which is attached to the spotting scope or other equipment, and a base unit, which is attached to the mounting arm. The top unit has a downwardly-extending cylindrical hub with four lobes extending radially outward from the hub. The lobes each have an inclined upper surface and a flat, horizontal lower surface with a single aperture or recess adapted to receive a detent plunger. The base unit has a cavity that is sized and shaped to match the lower portion of the top unit, with four lobe-shaped openings and side walls with inclined upper surfaces that match the incline of the upper surfaces of the lobes. A detent plunger protrudes through the lower surface of the cavity at a location that is 45° offset from the center of one of the lobe-shaped openings. In operation, the top unit is aligned with the base unit so that the lobes of the top unit are aligned with the lobe-shaped openings. The top unit is then inserted into the base unit so that the lower surface of one of the lobes depresses the detent plunger. The top unit is then rotated 45° in any direction, whereupon the detent plunger engages the recess in the lower surface of one of the lobes. This locks the top unit from further rotation. A tension screw is then tightened so that it bears on the inclined surface of one of the lobes. The tension screw, acting in cooperation with the inclined surfaces of the lobes, forces the top unit down and away from the tension screw, thereby eliminating any backlash which would potentially cause the equipment to rattle or otherwise fail to be held rigidly.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
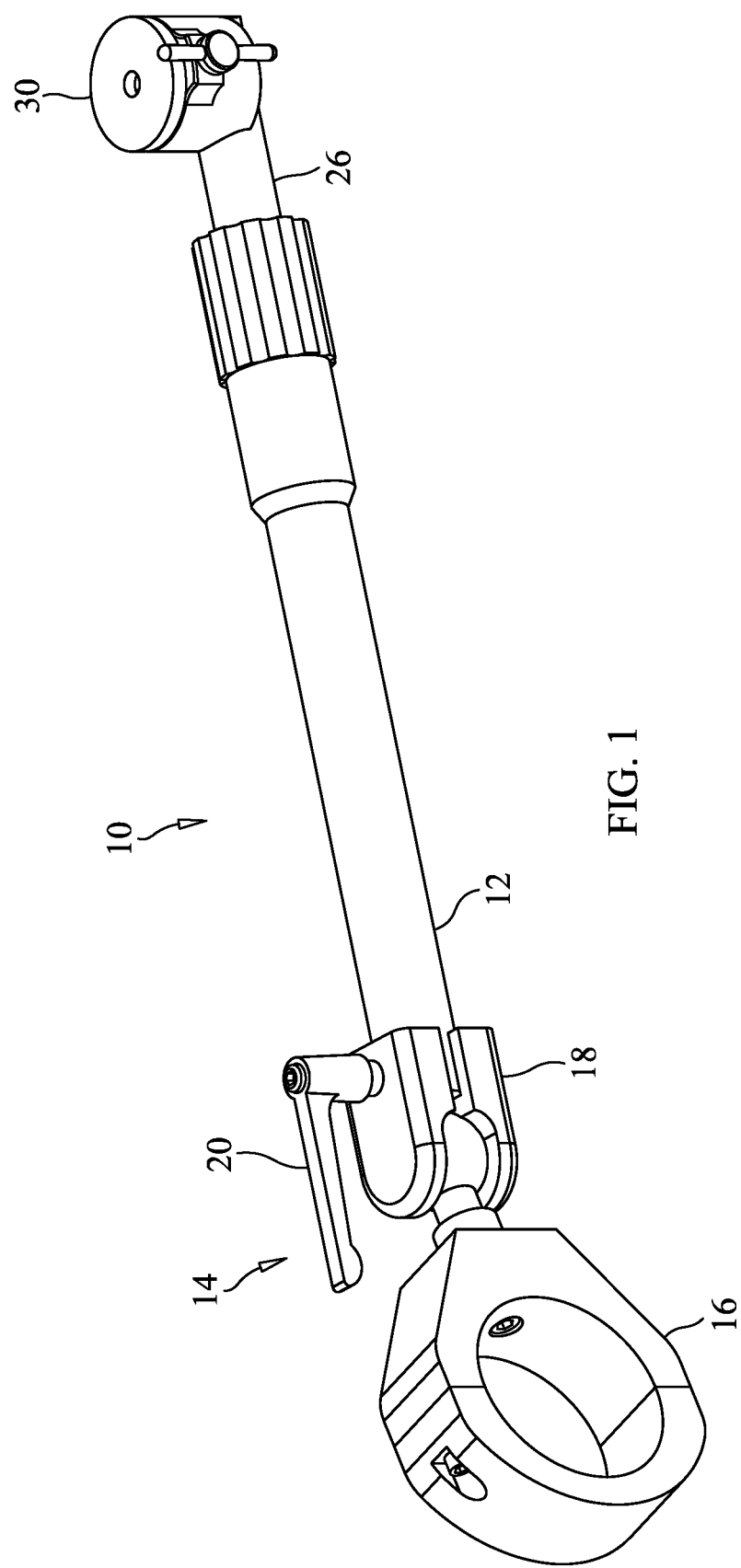
FIG. 1 is a perspective view of a mounting arm incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the figures and, in particular, FIG. 1, a mounting arm 10 incorporating features of the present invention comprises an elongated member such as shaft 12. The fixed end 14 of shaft 12 terminates at a clamp 16 which, in the illustrative embodiment comprises a circular clamp adapted to grip the upright tube of a vehicle roll cage. Although in the illustrative embodiment clamp 16 is a circular clamp, rectangular clamps, U-shaped clamps, chain plates or other mounting structures are considered equivalents and therefore may be used without departing being from the scope of the invention. Clamp 16 is attached to shaft 12 using a swivel joint 18 which, in the illustrative embodiment is a ball and socket joint having a tension adjustment 20 to enable swivel joint 18 to be fixed in a variety of positions. Shaft 12 preferably telescopes in a manner well-known to the art using a friction sleeve 24 to fix the telescoped shaft in position. The free end 26 of shaft 12 includes a quick-release adapter 30 the structure and function of which will be explained more fully hereinafter.

Figure 2:
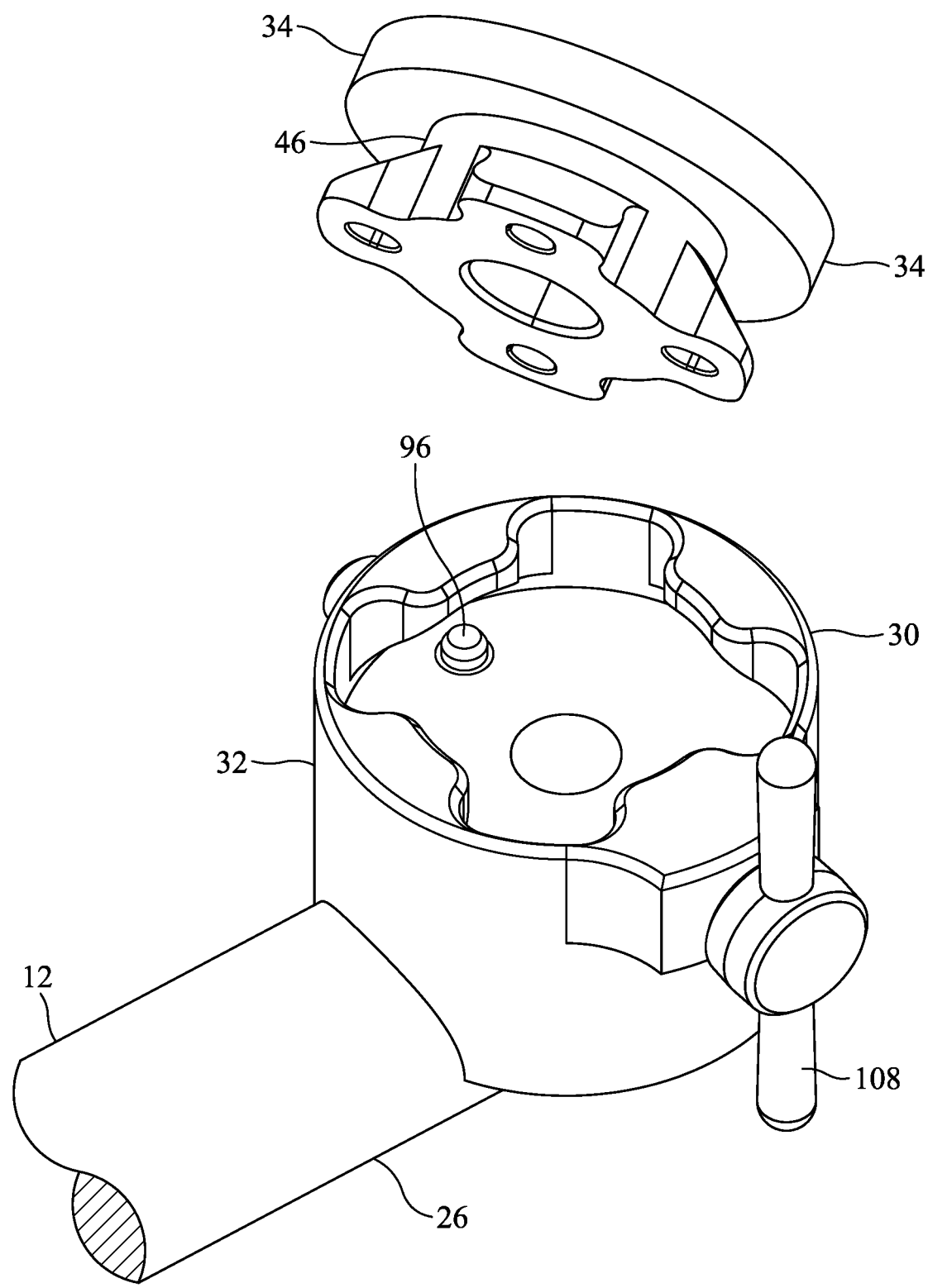
FIG. 2 is an exploded view of a quick-release adapter mounted to the free end of the mounting arm of FIG. 1.
Figure 3:
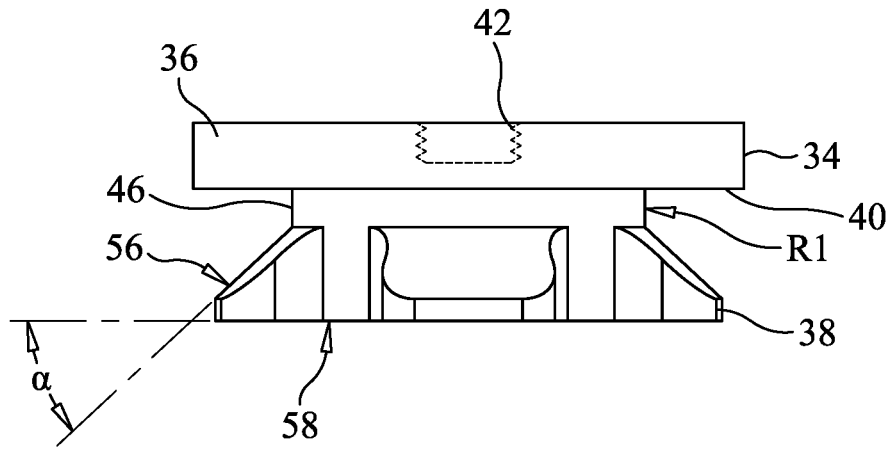
FIG. 3 is a side view of the top portion of the quick-release adapter of FIG. 2.
Figure 4:
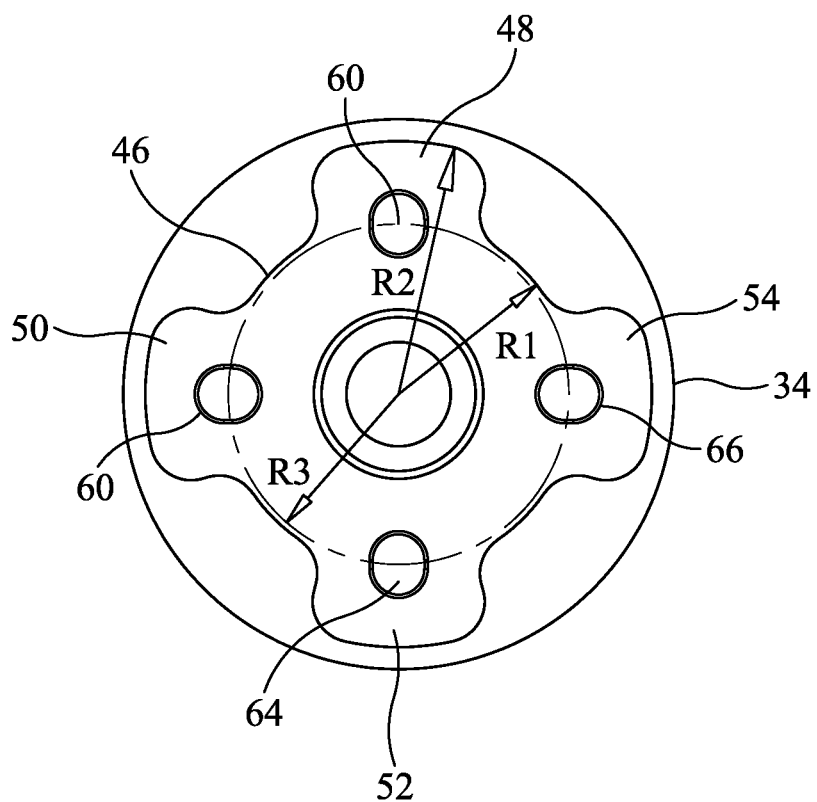
FIG. 4 is a top view of the top portion of the quick release adapter of FIG. 3.

With particular reference to FIGS. 2-4, quick-release adapter 30 comprises a base unit 32 and a top unit 34. In the illustrative embodiment, top unit 34 consists of an upper portion 36 and a lower portion 38. Upper portion 36 is generally cylindrical with a flat lower surface 40 and may include a threaded aperture 42 adapted to receive a standard camera mounting shoe, spotting scope, firearm clamp or the like. Top unit 34 further includes a lower portion 44, which in the illustrative embodiment consists of a downward-extending substantially cylindrical hub 46 having a predetermined radius $R_1$. In the illustrative embodiment, four lobes 48-54 extend radially outward from hub 46. Although in the illustrative embodiment there are four lobes, fewer than four lobes, for example one, two, or three lobes as well as more than four lobes, for example five, six, seven or even eight lobes may be used without departing from the scope of the invention. Each of lobes 48-54 extends out to a radius $R_2$ and has a downward sloping surface 56, which extends downward at an angle α, which in the illustrative embodiment is 45°. The lobes 48-54 and share a common substantially flat lower surface 58. Each of lobes 48-54 further includes a depression 60-66, which in the illustrative embodiment comprises a blind hole, however, a through hole or slot is considered an equivalent and within the scope of the invention. The center of each of depressions 60-66 is located at a predetermined radius $R_3$, which is less than or equal to radius $R_1$ for reasons that will be explained more fully hereinafter.

Figure 5:
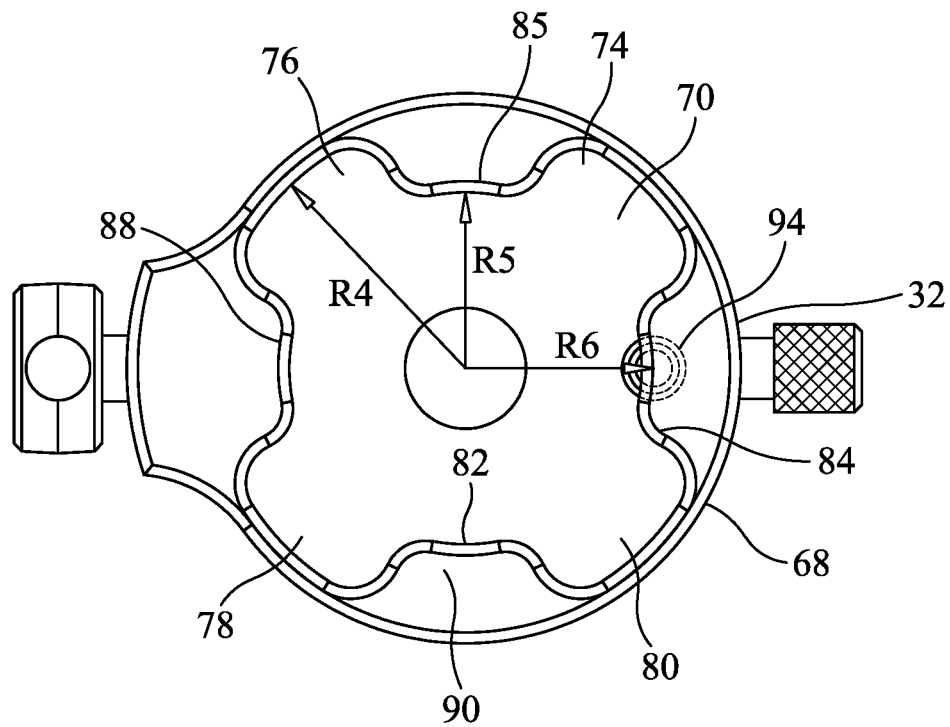
FIG. 5 is a top view of the base unit of the quick-release adapter of FIG. 2.
Figure 6:
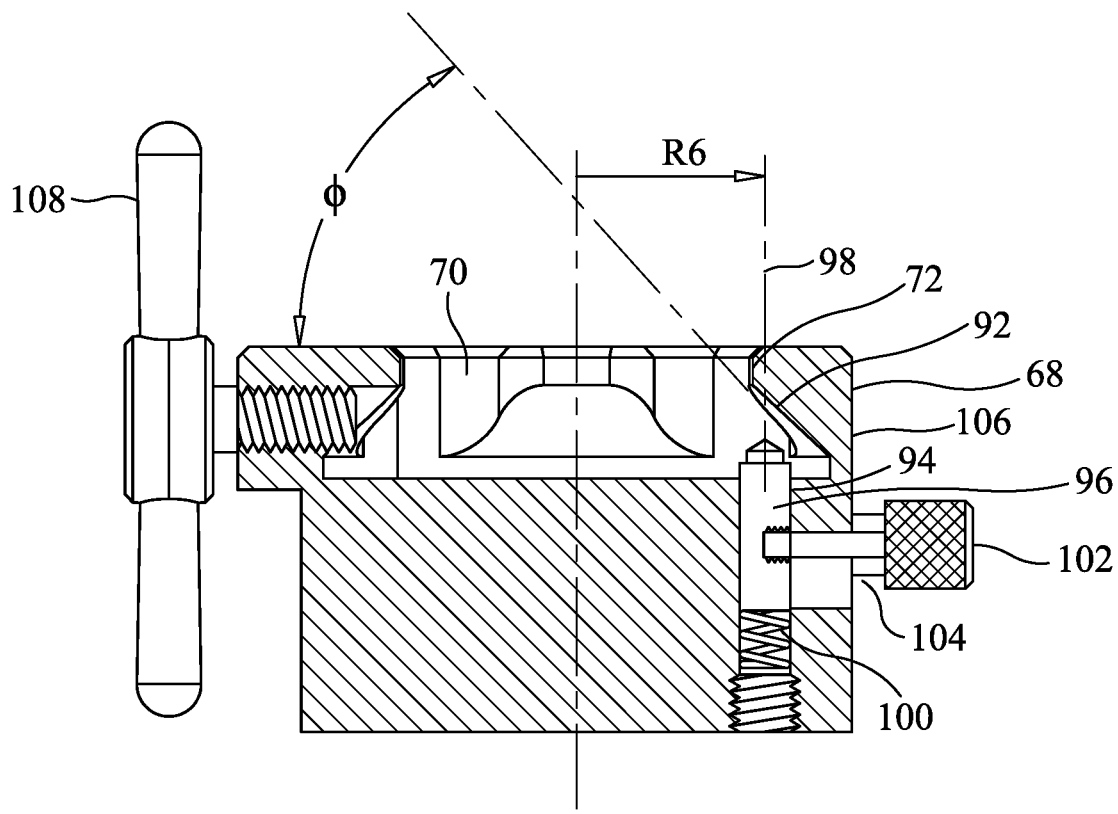
FIG. 6 is a cross-sectional view of the base unit of FIG. 5.

With particular reference to FIGS. 5-6, base unit 32 comprises a body 68 with a cavity 70 formed therein. The open end 72 of cavity 70 has a profile that is shaped to match the profile of lower portion 38 of top unit 34. In the illustrative embodiment, open end 72 includes four lobed-shaped openings 74-80 each of which has an outer radius $R_4$, which is slightly smaller (e.g. 0.001-0.010 inch) than the radius $R_2$ of lobes 46-54. The inner edge 82 of open end 72 has a radius $R_5$, which is slightly smaller (e.g. 0.001-0.010 inch) than the radius $R_1$ of hub 46. This provided sufficient clearance for top unit 34 to be inserted into cavity 70. The walls 84-90 that extend between adjacent lobed-shaped openings 74-80 each have an inclined upper surface 92, which is disposed at an angle $\phi$, which is substantially equal to the slope of the downward sloping surface 56 of lower portion 46 of top unit 34.

Base unit 32 further includes a vertical bore 94 which houses a detent plunger 96. The longitudinal axis of 98 vertical bore 94 is disposed at a radius $R_6$, which is equal to or less than the radius $R_1$ of hub 46. The longitudinal axis of 98 vertical bore 94 is angularly displaced so that it is midway between adjacent lobe-shaped openings, which in the illustrative embodiment, means the longitudinal axis of 98 vertical bore 94 is angularly disposed 45° from the center of the two-adjacent lobe-shaped openings 74, 80. A resilient member such as spring 100 urges detent plunger upwards into cavity 70. A release lever 102 is attached to detent plunger 96 through slot 104 formed in the side 106 of body 68.

In operation, the top unit 34 is aligned with the base unit 32 so that the lobes of the top unit 48-54 are aligned with the lobe-shaped openings 74-80. The top unit 34 is then inserted into the base unit 32. Because the radius $R_6$, is equal to or less than the radius $R_1$ of hub 46, as top unit 34 is inserted into base unit 32, the lower surface of one of the lobes 48-54 depresses the detent plunger 96. The top unit is then rotated 45° in any direction, whereupon the detent plunger 96 engages the recess 60 in the lower surface of one of the lobes. This locks the top unit 34 from further rotation relative to base unit 32 while the inclined upper surface 92 of the base unit 32 bearing on the downward-sloping surface 58 of the top unit 34 captures top unit 34 inside cavity 70. Tension screw 108 is then tightened so that it bears on the downward-sloping surface 58 of one of the lobes. The tension screw, acting in cooperation with the downward-sloping surface 58 of the lobes forces the top unit 34 down and away from the tension screw 108, thereby eliminating any backlash which would potentially cause the equipment to rattle or otherwise fail to be held rigidly.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____")

What is claimed is:

1. A quick release adapter comprising:
a base unit and a top insert unit;
the top insert unit comprising an upper portion and a lower portion, the upper portion having a first lower surface, the first lower surface having a substantially flat profile, the lower portion having a downward-extending, substantially cylindrical hub, the hub having a first predetermined radius $R_1$ and a plurality of lobes extending radially outward from the hub, each of the plurality of lobes having a downward-sloping upper surface and a substantially flat lower surface, the downward-sloping surface extending at a first predetermined angle;
the lower surface of each of the lobes having a depression adapted to receive a detent, the center of each depression being disposed at a second predetermined radius $R_3$, the second predetermined radius being no greater than the first predetermined radius;
the base unit comprising a body with a cavity formed therein, the cavity having a lateral wall, a bottom surface and a plurality of lobed-shape upward-facing openings, the plurality of lobed-shaped openings being of equal number and sized to match the plurality of lobes extending from the hub, the cavity further comprising a plurality of undercut walls extending between each of the plurality of lobed-shaped openings, each of the undercut walls having an inclined upper surface, the inclined upper surface being disposed at a second predetermined angle substantially parallel to the first predetermined angle;
the base unit further comprising a longitudinal bore and a detent positioned within the bore, the detent having a body with a tip extending through the bottom surface of the cavity, the tip being positioned in the base unit at a radius substantially equal to the second predetermined radius, whereby the detent extends upwards through the bottom surface of the cavity to engage one of the depressions in the lower surface of the lobes.

2. The quick release adapter of claim 1, wherein:
the longitudinal bore is positioned substantially midway between adjacent lobe-shaped openings.

3. The quick release adapter of claim 2, wherein:
the plurality of lobes each have an arcuate outer edge with a predetermined radius $R_2$; and
each of the plurality of lobe-shaped openings has an arcuate outer edge with a predetermined radius $R_4$ substantially equal to the predetermined radii of the outer edges of the plurality of lobes.

4. The quick release adapter of claim 3, further comprising
a resilient member urging the detent body upwards through the bottom surface of the cavity.

5. The quick release adapter of claim 4, wherein the base unit further comprises a slot formed in a side wall, the slot intersecting the longitudinal bore, the base unit further comprising a release lever engaging the detent body through the slot.

6. The quick release adapter of claim 5, further comprising a tension screw threaded through an aperture in the lateral wall of the base unit, the tension screw adapted to apply a lateral force to the downward-sloping upper surface of one of said plurality of lobes.

* * * * *